United States Patent
An et al.

(10) Patent No.: US 8,626,544 B2
(45) Date of Patent: Jan. 7, 2014

(54) METHOD AND APPARATUS COMBINING CONTROL THEORY AND BUSINESS PERFORMANCE MANAGEMENT

(75) Inventors: Lianjun An, Yorktown Heights, NY (US); Bala Ramachandran, Harrison, NY (US); Karthik Sourirajan, West Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 12/057,917

(22) Filed: Mar. 28, 2008

(65) Prior Publication Data
US 2008/0208659 A1  Aug. 28, 2008

Related U.S. Application Data

(63) Continuation of application No. 11/117,405, filed on Apr. 29, 2005, now abandoned.

(51) Int. Cl.
*G06Q 10/00* (2012.01)

(52) U.S. Cl.
USPC ........... 705/7.12; 705/7.11; 705/7.22; 700/28

(58) Field of Classification Search
USPC .......................... 705/7.11–7.42; 700/29–107
See application file for complete search history.

(56) References Cited

U.S. PATENT DOCUMENTS

| | | | | |
|---|---|---|---|---|
| 5,630,070 A | * | 5/1997 | Dietrich et al. | 705/7.23 |
| 5,946,662 A | * | 8/1999 | Ettl et al. | 705/7.26 |
| 5,953,707 A | * | 9/1999 | Huang et al. | 705/7.25 |
| 5,970,465 A | * | 10/1999 | Dietrich et al. | 705/7.22 |
| 5,974,395 A | * | 10/1999 | Bellini et al. | 705/7.31 |
| 6,078,900 A | * | 6/2000 | Ettl et al. | 705/28 |
| 6,151,582 A | * | 11/2000 | Huang et al. | 705/7.25 |
| 6,167,380 A | * | 12/2000 | Kennedy et al. | 705/7.31 |
| 6,188,989 B1 | * | 2/2001 | Kennedy | 705/7.25 |
| 6,477,660 B1 | * | 11/2002 | Sohner | 714/1 |
| 6,597,958 B1 | * | 7/2003 | Starr | 700/29 |
| 6,606,529 B1 | * | 8/2003 | Crowder et al. | 700/100 |
| 6,671,673 B1 | * | 12/2003 | Baseman et al. | 705/7.26 |
| 6,671,818 B1 | * | 12/2003 | Mikurak | 714/4.21 |
| 6,675,128 B1 | * | 1/2004 | Hellerstein | 702/182 |
| 6,718,358 B1 | * | 4/2004 | Bigus et al. | 718/100 |
| 6,892,192 B1 | * | 5/2005 | Geddes et al. | 706/14 |
| 6,922,593 B2 | * | 7/2005 | Weiss | 700/30 |
| 6,988,076 B2 | * | 1/2006 | Ouimet | 705/7.36 |
| 7,039,559 B2 | * | 5/2006 | Froehlich et al. | 702/187 |

(Continued)

OTHER PUBLICATIONS

Lin, P.H., Wong, D.S.H., Jang, S.S., Shieh, S.S. and Chu, J.Z., "Controller design and reduction of bullwhip for a model supply chain system using z-transform analysis", Journal of Process Control, 14 5 487-499.*

(Continued)

*Primary Examiner* — Alan S Miller
(74) *Attorney, Agent, or Firm* — Whitham, Curtis, Christofferson & Cook, P.C.; Daniel P. Morris

(57) ABSTRACT

A control methodology and component in Business Performance Management (BPM) Systems. This enables firms to exploit control theoretic techniques for Business Performance Management. Information from BPM systems is used to calibrate models of the business process. This model is then used to assess and optimize control actions to manage business performance, on the basis of which a control action is selected for business process execution.

9 Claims, 12 Drawing Sheets

(56) References Cited

U.S. PATENT DOCUMENTS

| | | | |
|---|---|---|---|
| 7,054,706 B2* | 5/2006 | Kempf et al. | 700/121 |
| 7,080,026 B2* | 7/2006 | Singh et al. | 705/7.31 |
| 7,117,130 B1* | 10/2006 | Megiddo | 703/2 |
| 7,225,981 B2* | 6/2007 | Jongebloed | 235/385 |
| 7,260,501 B2* | 8/2007 | Pattipatti et al. | 702/183 |
| 7,467,095 B2* | 12/2008 | Ouimet | 705/7.37 |
| 7,499,766 B2* | 3/2009 | Knight et al. | 700/107 |
| 7,516,084 B1* | 4/2009 | Sankaran et al. | 705/7.31 |
| 7,529,695 B2* | 5/2009 | Yang et al. | 705/28 |
| 2002/0002414 A1* | 1/2002 | Hsiung et al. | 700/95 |
| 2002/0072956 A1* | 6/2002 | Willems et al. | 705/10 |
| 2002/0116348 A1* | 8/2002 | Phillips et al. | 705/400 |
| 2002/0133368 A1* | 9/2002 | Strutt et al. | 705/1 |
| 2002/0156663 A1* | 10/2002 | Weber et al. | 705/7 |
| 2002/0169657 A1* | 11/2002 | Singh et al. | 705/10 |
| 2003/0004777 A1* | 1/2003 | Phillips | 705/10 |
| 2003/0014379 A1* | 1/2003 | Saias et al. | 706/45 |
| 2003/0018490 A1* | 1/2003 | Magers et al. | 705/1 |
| 2003/0023466 A1* | 1/2003 | Harper | 705/7 |
| 2003/0126103 A1* | 7/2003 | Chen et al. | 706/50 |
| 2003/0135399 A1* | 7/2003 | Ahamparam et al. | 705/7 |
| 2003/0154144 A1* | 8/2003 | Pokorny et al. | 705/28 |
| 2003/0158611 A1* | 8/2003 | Weiss | 700/31 |
| 2003/0233289 A1* | 12/2003 | Yang et al. | 705/28 |
| 2003/0233290 A1* | 12/2003 | Yang et al. | 705/28 |
| 2003/0236718 A1* | 12/2003 | Yang et al. | 705/28 |
| 2004/0138933 A1* | 7/2004 | LaComb et al. | 705/7 |
| 2004/0138936 A1* | 7/2004 | Johnson et al. | 705/7 |
| 2004/0172341 A1* | 9/2004 | Aoyama et al. | 705/26 |
| 2004/0230474 A1* | 11/2004 | Dogan et al. | 705/10 |
| 2004/0243460 A1* | 12/2004 | Dogan et al. | 705/10 |
| 2004/0267394 A1* | 12/2004 | Kempf et al. | 700/99 |
| 2005/0027577 A1* | 2/2005 | Saeed | 705/8 |
| 2005/0108072 A1* | 5/2005 | Retsina | 705/7 |
| 2005/0165635 A1* | 7/2005 | Moessner | 705/10 |
| 2005/0171827 A1* | 8/2005 | Denton et al. | 705/8 |
| 2005/0256752 A1* | 11/2005 | Ramachandran et al. | 705/7 |
| 2005/0288993 A1* | 12/2005 | Weng et al. | 705/10 |
| 2006/0089895 A1* | 4/2006 | Joye et al. | 705/35 |
| 2006/0111881 A1* | 5/2006 | Jackson | 703/2 |
| 2006/0111921 A1* | 5/2006 | Chang et al. | 705/1 |
| 2006/0235557 A1* | 10/2006 | Knight et al. | 700/103 |
| 2007/0192213 A1* | 8/2007 | Wu et al. | 705/28 |

OTHER PUBLICATIONS

"Performance Metrics in Supply Chain Management"; J. P. C. Kleijnen and M. T. Smits Source: The Journal of the Operational Research Society, vol. 54, No. 5 (May 2003), pp. 507-514 Published by: Palgrave Macmillan Journals on behalf of the Operational Research Society Stable URL: http://www.jstor.org/stable/4101738.*

Dejonckheere, J., Disney, S.M., Lambrecht, M.R. and Towill, D.R., (2004), "The impact of information enrichment on the bullwhip effect in supply chains: A control engineering perspective", European Journal of Operational Research, vol. 153, No. 3, pp. 727-750, ISSN: 0377-2217.*

Dunbar et al. (Dunbar, William B; Desa, S.; "Distributed Model Predictive Control for Dynamic Supply Chain Management", Int. Workshop on Assessment and Future Directions of NMPC, Freudenstadt-Lauterland, Germany, Aug. 26-30, 2005).*

Edgar Perea-Lopez, B. Erik Ydstie, Ignacio E. Grossmann,("A model predictive control strategy for supply chain optimization", Computers & Chemical Engineering, vol. 27, Issues 8-9, 2nd Pan American Workshop in Process Systems Engineering, Sep. 15, 2003, pp. 1201-1218, ISSN 0098-1354, DOI: 10.1016/S0098-1354(03)00047-4).*

Information Distortion in a Supply Chain: The Bullwhip Effect; H. Lee, et al., Management Science/vol. 43 No. 4, Apr. 1997 pp. 546-558.

Measuring and avoiding the bullwhip effect: A Control theoretic approach; J. Dejonckheere, et al.; European Journal of Operational Research; 2002 Elsevier Science pp. 567-590.

* cited by examiner

METHOD AND APPARATUS COMBINING CONTROL THEORY AND BUSINESS PERFORMANCE MANAGEMENT

CROSS-REFERENCE TO RELATED APPLICATION

The instant application is related to copending U.S. patent application entitled "Method for Managing and Controlling Stability in Business Activity Monitoring and Management Systems", Ser. No. 10/843,451 filed May 12, 2004, by B. Ramachandran et al., which is continuation of U.S. Ser. No. 11/117,405 filed Apr. 29, 2005.

BACKGROUND OF THE INVENTION

1. Field of the Invention

The present invention generally relates to management of business performance and, more particularly, to a methodology and apparatus for combining control theory with Business Performance Management.

2. Background Description

Business Performance Management is a key emerging technology positioned to enable optimization of business operations and information technology (IT) infrastructure, so as to achieve dynamic business performance targets. This is done by continually monitoring and optimizing business processes, not just during business process design, but also after the process has been deployed. Hence, there is a need for developing capabilities that enable the control and dynamic management of business process performance. These capabilities should be adaptable to changing conditions in the business process environment and to uncertainties in the various business process attributes.

SUMMARY OF THE INVENTION

It is therefore an object of the present invention to provide a method and apparatus to achieve optimal business process performance, by utilizing control theoretic principles and algorithms that adaptively determine the attributes of the actions taken to manage the business process.

Business Performance Management aims at creating a culture of continuous performance improvement by modeling, deploying, monitoring and managing business solutions. This invention enables that by the use of control theory based algorithms to optimize the business actions. It uses the notion of business process targets and business process levers. Further, it determines the optimal setting for the business process levers to meet business process targets and dynamically manage the process performance.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In the following description, we assume the existence of a Business Performance Management system that probes different enterprise events, monitors different enterprise performance indicators and assists in the management of Business Performance. The performance indicators could include metrics both at business and information technology (IT) levels. This invention is not limited by the specific details of a particular Business Performance Management system. We assume the existence of one or more mechanisms for accessing the monitored information and alerts, including, but not limited to dashboard portals, e-mail, personal digital assistants (PDAs), cell phones, and the like. This invention is not limited by the specific details of Business Process execution, including use of workflow engines. Further, this invention is not limited by the type of business process, business process targets, business process levers and business process inputs.

Figure 1:
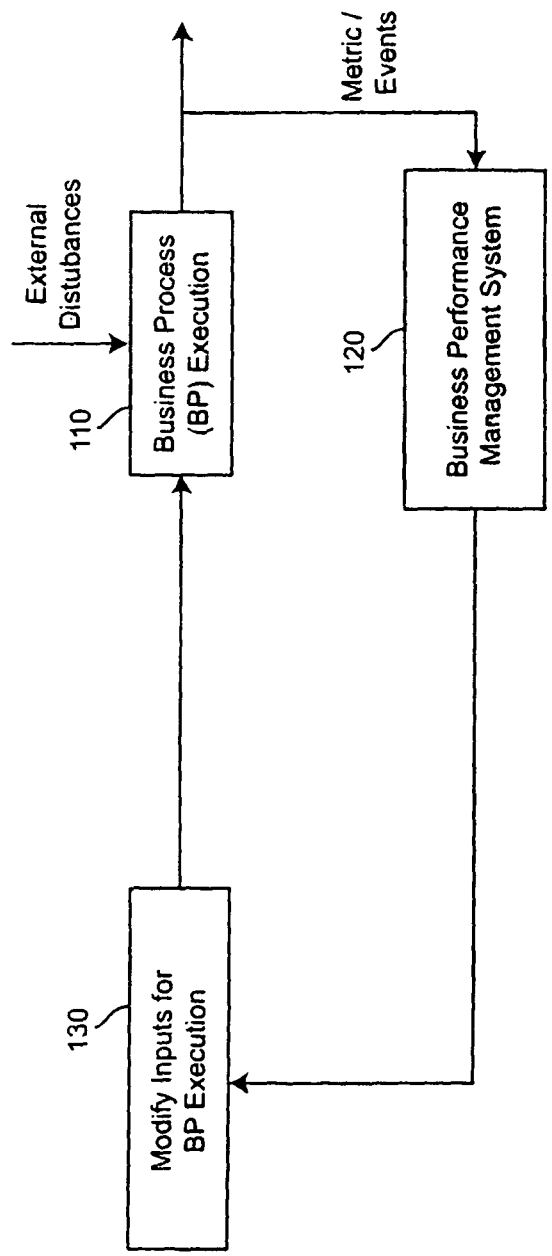
FIG. 1 is a block diagram showing a representative process for using Business Performance Management systems.

Referring now to the drawings, and more particularly to FIG. 1, there is shown a representative process for using Business Performance Management systems. The Business Process Execution 110 is managed by a Business Performance Management (BPM) system 120. Based on the events and metrics that are processed by the BPM system, the Business process inputs are modified 130 for BP execution. We alternatively refer to Business Process inputs as Business Process levers, as they can be changed to modify and manage the Business Process performance. This feedback loop is fundamental to the value proposition of BPM systems. Typically a process involving people determines the Business process inputs. Although people can apply judgment in determining the business process inputs, this typically results in a sub-optimal performance.

Figure 2:
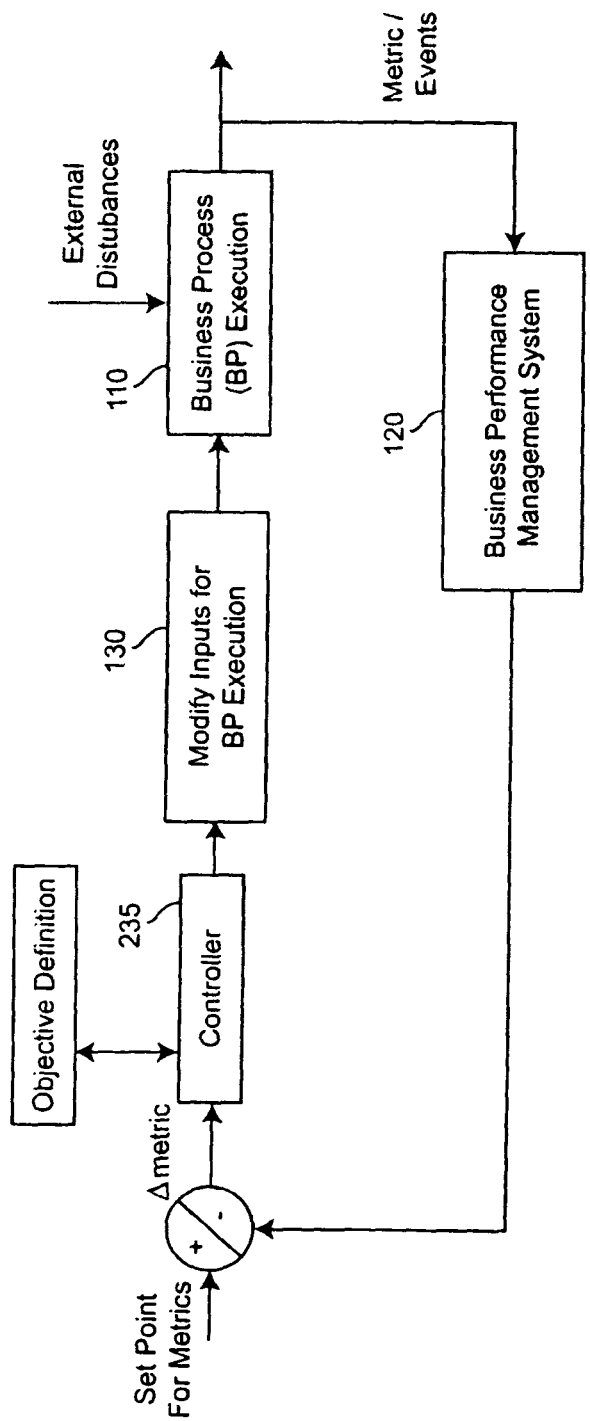
FIG. 2 is a block diagram showing a representative process for using Business Performance Management systems combined with control theory, according to the present invention.

A novel element of this invention is in the combination of control theory with Business Performance Management systems to determine the inputs for Business Process Execution, as shown in FIG. 2. We use the notion of Business Process targets to define a set point for Business Performance metrics. A Business Performance Controller 235 adaptively analyzes different control algorithms and recommends a control action to modify Business Process inputs for BP execution, either in real-time or on an ongoing basis, as is appropriate in the context of a specific business process. The control action may be either taken manually or automatically. This is a known concept in control theory and has been applied in several practical situations, such as chemical process control (see, for example, Process Control by Coughanowr and Koppel, McGraw-Hill Publishers). This invention proposes the use of a controller system component in Business Performance Management systems.

Figure 3:
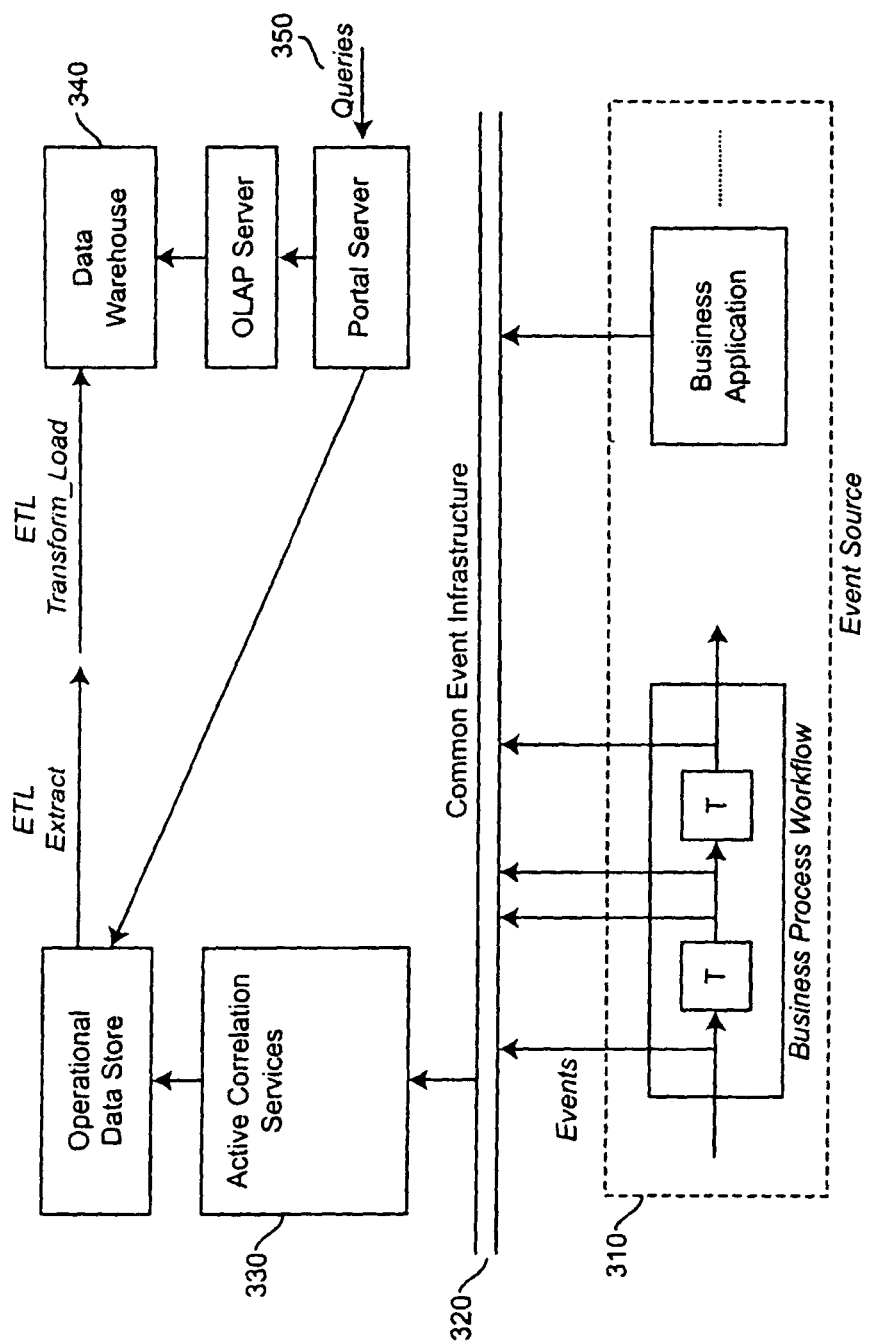
FIG. 3 is a block diagram showing some key components of Business Performance Management systems shown in FIG. 2.

Control theory is a well-developed field used in prior art in several practical situations, such as chemical process control. This invention proposes the use of a controller system component in Business Performance Management (BPM) systems. BPM systems refer to a broad range of systems that are designed to help manage business performance. In order to further clarify the scope of this invention from prior art, the important components of BPM systems are illustrated in FIG. 3. Business processes 310 generate events that are sent to a Common Event Infrastructure 320. These events are then correlated at 330 to identify situations of interest (both business and IT situations). The event information is stored in a data warehouse 340 that may be queried by different types of users through portals to monitor and manage business performance 350. It is assumed that users will take appropriate actions based on the queried information to better manage business performance. This invention enables the use of control algorithms on the business performance information to identify appropriate modification of inputs for business process execution.

Figure 4:
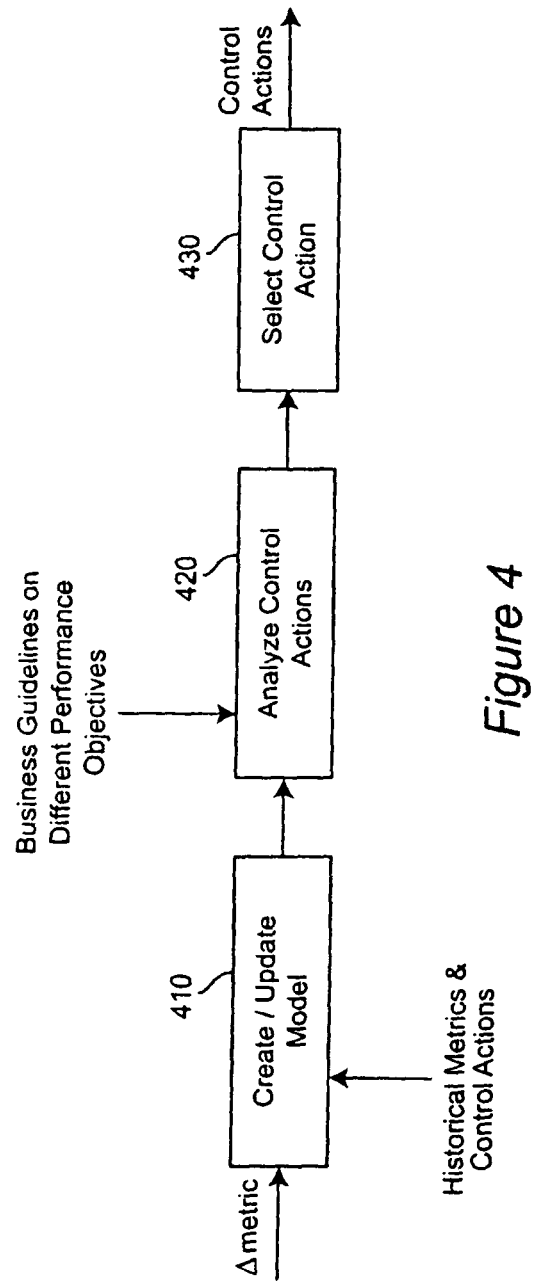
FIG. 4 is a block diagram showing the essential components involved in combining control theory with Business Performance Management systems.
Figure 5:
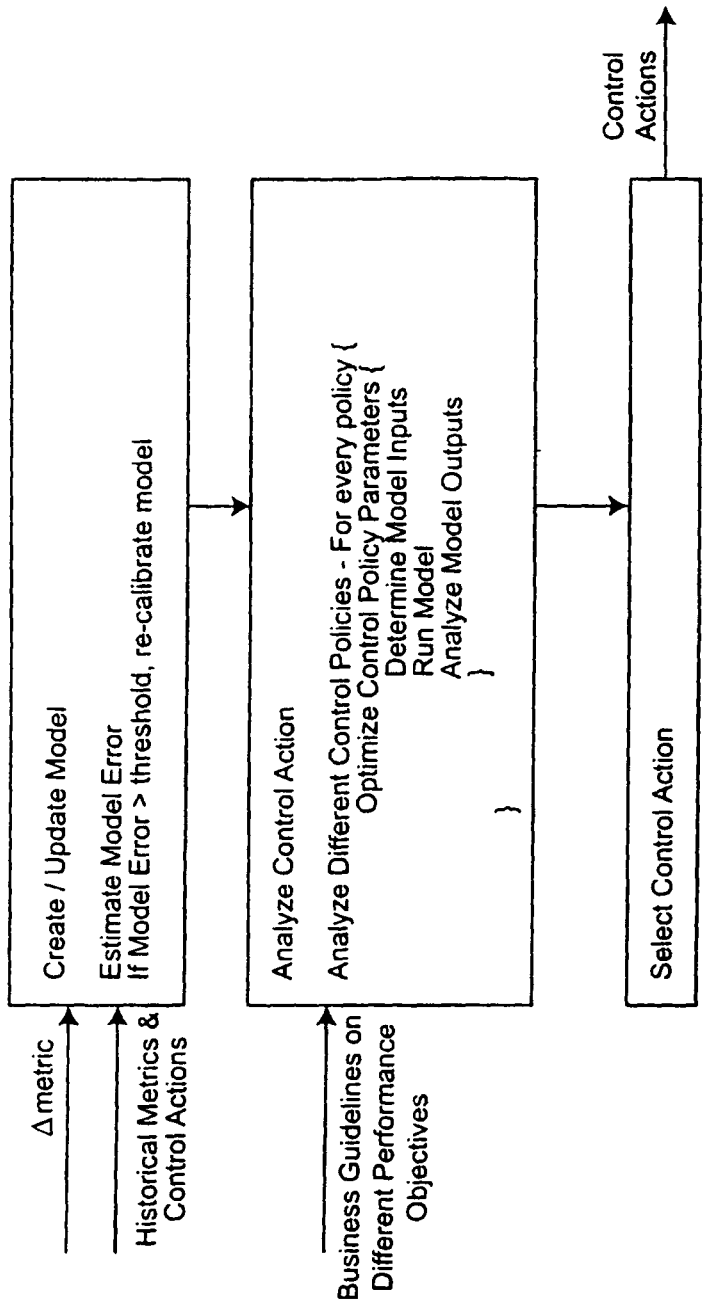
FIG. 5 is a flow diagram showing a high level description of the procedures that are implemented when combining control theory with Business Performance Management systems.

As shown in FIG. 4, there are several steps involved in using control algorithms for Business Performance Management. These steps are further explained in the flow diagram in FIG. 5. First, the underlying business performance models are created and updated (410). The model is based on historical data on business performance metrics and control actions, using which the performance can be predicted. This prediction can be compared with the observed business performance metrics to estimate the model error. If the model error exceeds a user specified threshold, the model is recalibrated. The optimal control action is then determined 430 by analyzing the impact of different alternative control actions 420. This is done in two steps—first by selecting a control policy (such as Proportional-Integral Control) and then by selecting the parameters governing the control policy. Business guidelines on different business performance objectives are used to guide the selection of an appropriate control action. This invention is not limited by the choice of business metrics or the specifics of a control policy or algorithm.

Figure 6:
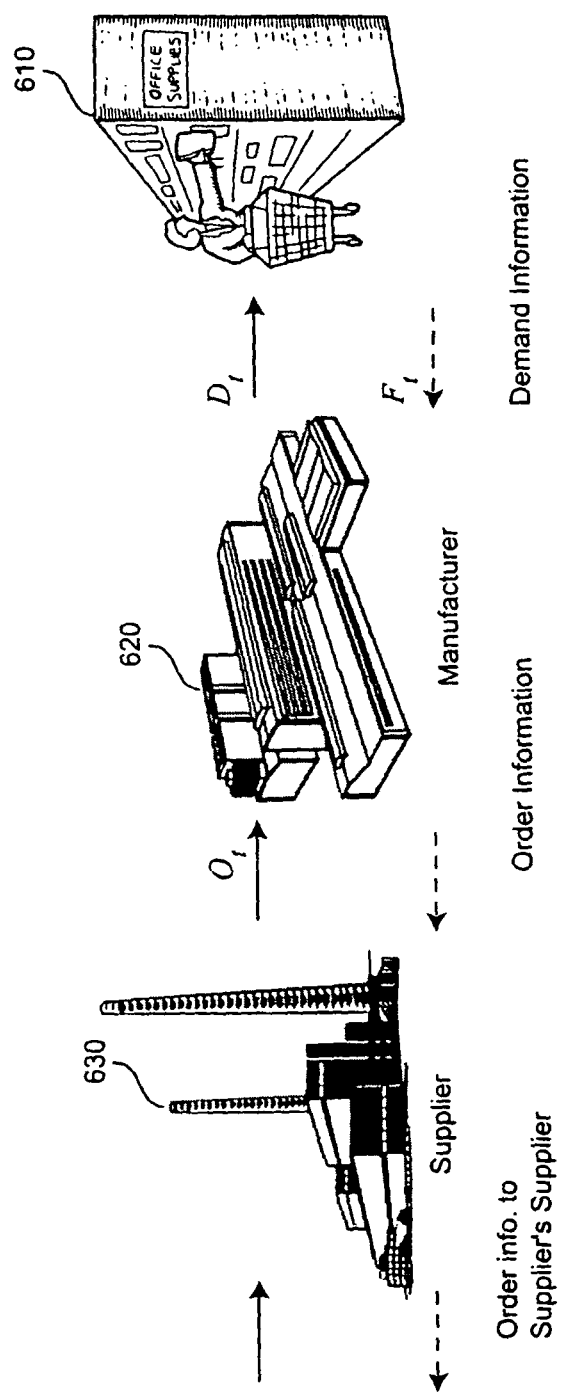
FIG. 6 is a pictorial representation showing a two-stage supply chain that is used as a scenario in the embodiment to illustrate the combination of control theory with Business Performance Management systems according to the present invention.

We describe here a specific embodiment of the invention combining control theory and Business Performance Management using a simple example of business performance management in supply chains. A schematic of the supply chain scenario, consisting of a simple two-level supply chain that consists of one manufacturer and one supplier, is depicted in FIG. 6. The manufacturer 620 makes and sells one product, the raw materials for which are obtained from the supplier 630. The manufacturer 620 forecasts demands 610 for a specific time horizon, which forms the basis for the manufacturer's production planning process. The production plan is used to drive the Materials Requirements Planning process to generate supplier requirements. The manufacturer 620 places orders to the supplier 630 in each period. This order information acts as the basis for the supplier to plan production.

These data inputs to the supplier 630 undergo constant churn in response to changes in supply-demand balance at the manufacturer 620. For example, the manufacturer production unit might suffer an unplanned outage or there can be a sudden shift in the demand. This triggers changes in the supplier data inputs very frequently. At the manufacturer's end, demand is constantly changing, as customers can place new orders or modify/cancel existing orders. Supply commitments also change based on changes in the suppliers plan. In this example, the business performance metrics are inventory costs and customer service levels (as measured by the backorder costs). We assume that the manufacturer uses a Business Performance system to manage the performance of the supply chain. This can be optionally linked to business domain specific applications, i.e. supply chain applications in this case. In this embodiment, we describe how supply chain ordering policies can be determined based on adaptive use of control theoretic policies to optimize business performance metrics under changing forecast scenarios.

Figure 7:
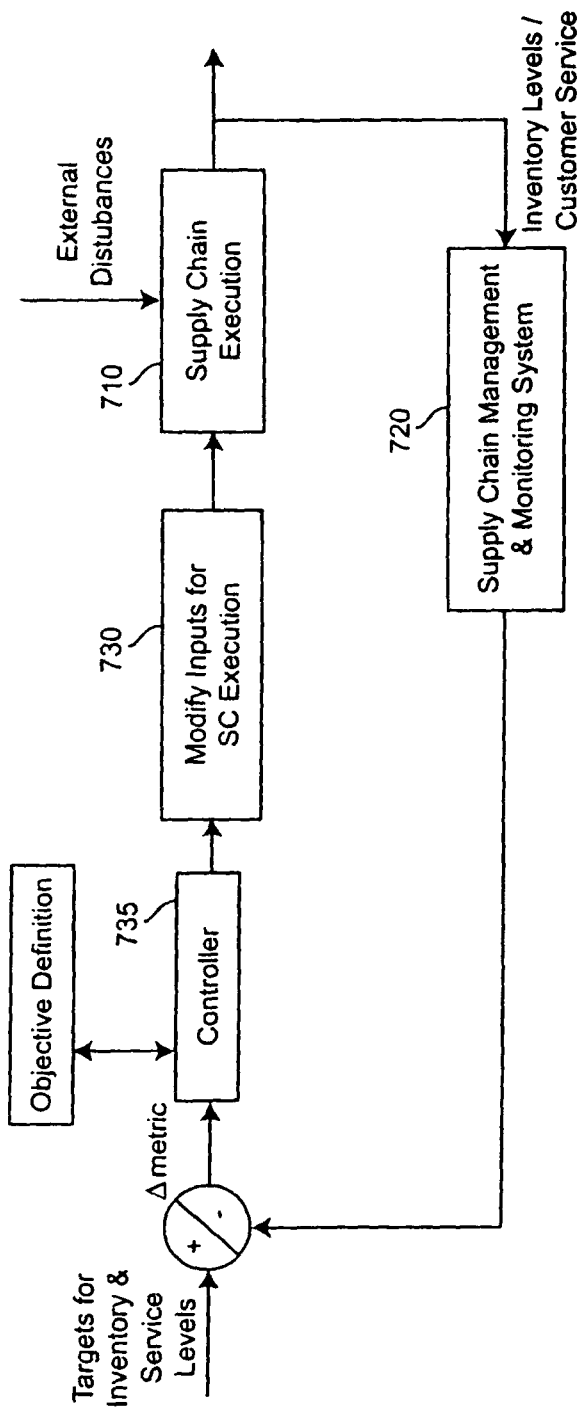
FIG. 7 is a block diagram showing the essential components involved in combining control theory with Business Performance Management systems for the Supply Chain Management scenario.
Figure 8:
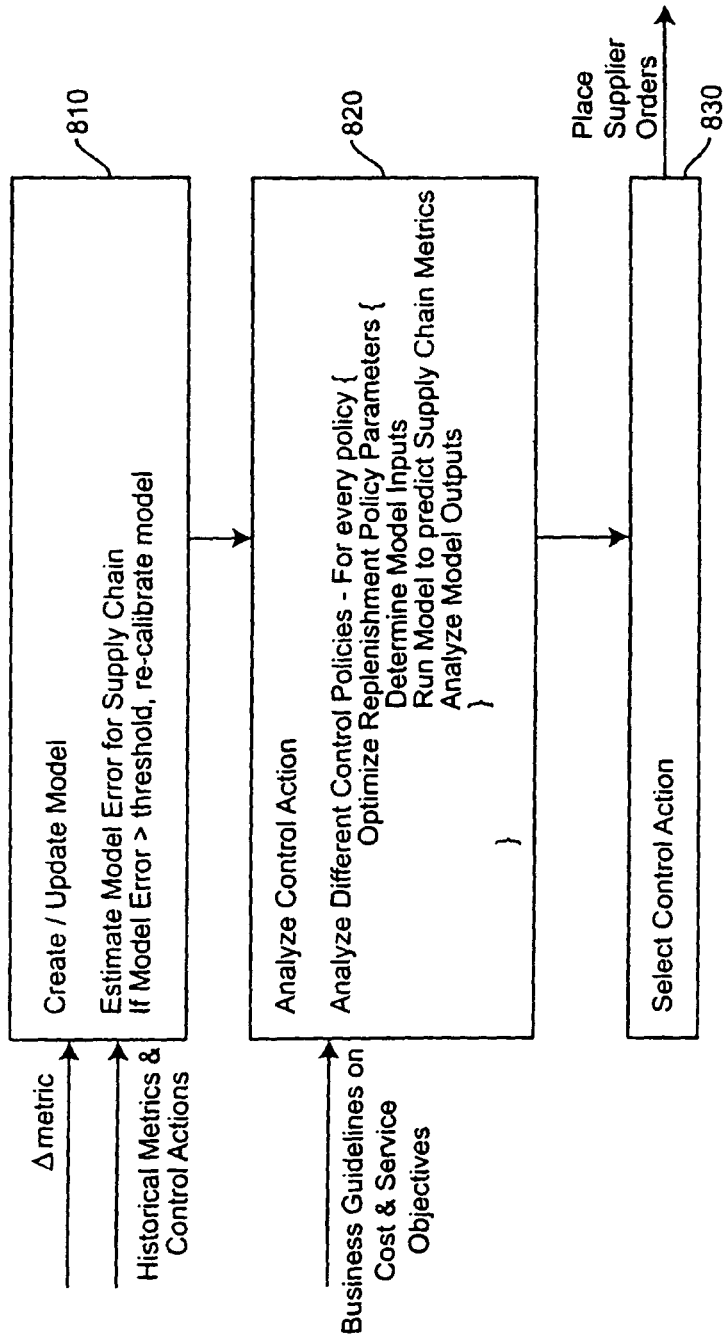
FIG. 8 is a flow diagram showing a high level description of the procedures that are implemented when combining control theory with Business Performance Management systems for the Supply Chain Management scenario.

FIG. 7 shows a block diagram that illustrates how control theory can be combined with Business Performance Management for this scenario. The supply chain execution 710 is managed by BPM systems 720 tailored for supply chain management. The observed inventory and service levels are compared against specified targets to estimate deviations in business performance. Different replenishment policies are analyzed based on their overall business performance impact by the controller 735. On this basis, a replenishment policy is selected and orders are placed for supply chain execution 730. There are several research papers exploring specific control policies for replenishment orders for a given scenario (see, for example, Dejonckheere J, Disney S M, Lambrecht M R, Towill D R, "Measuring and avoiding the bullwhip effect: a control theoretic approach", *European Journal of Operational Research*, vol. 147, no. 3, 2003). FIG. 8 provides a flow diagram that details this further. First, the underlying models predicting inventory and service levels are updated, if appropriate. Then, the optimal control policy is determined, by using the model to predict future business performance for different control policies and different settings of parameters that govern the control policy. The control policy thus determined is then executed; this may involve placing replenishment orders to the suppliers using the appropriate delivery channels.

In order to analyze different control methods further in the context of this scenario, we make some assumptions. This invention is by no means limited by these assumptions, rather, these allow us to formulate a specific model and perform analyses of different control policies. We assume that the demand forecasts (FD) are determined using an exponential smoothing method, governed by the parameter $T_a$. Let us now put down some notations for further analysis.

$T_p$=Lead Time between placing orders and receiving them
$T_n$=Proportional control parameter
$T_d$=Derivative control parameter
$T_i$=Integral control parameter
D=Demand
O=Orders
NS=Net Stock=(Excess Inventory On-hand−Backlogs)
DNS=Desired Net Stock=Safety Stock=$\alpha \times FD$, $\alpha$ positive
ENS=Net Stock Error=(DNS−NS)
WIP=Pipeline Orders
DWIP=Desired Pipeline=Lead Time Demand=$T_p \times FD$
EWIP=Pipeline Error=(DWIP−WIP)

The aim of a control policy is, given a deviation from desired state at time t, e(t), it determines the adjustment, u(t), that needs to be made to the business process levers in order to bring the system to the desired state. At the same time we want to optimize a defined objective (such as total cost evaluated as the sum of inventory and ordering costs) that captures the desired business metrics. Some examples of common control policies are Proportional Control, Proportional Integral Control, Proportional Derivative Control and Proportional Integral Derivative Control (see any textbook on control theory for a detailed discussion of this and other control policies—for example, K. Ogata, *Modern Control Engineering*, Prentice Hall, 2001.)

We will now define the objective function and the control policies used in the preferred embodiment. The methodology below can be extended to any desired combination of business metrics and control policies.

Objective Function for capturing trade-off between responsiveness and volatility in the system $$\text{Min}\{c_h*\max(NS,0)+c_b*\max(-NS,0)+p*\text{dev}(O)\}$$

where $C_h$, $C_b$ and p are the holding cost, the backlog cost and penalty for deviation of orders respectively. While the inventory and backlog costs measure the responsiveness of the system to the customer's demands, costing the deviation of the orders helps measure the volatility in the system or the Bullwhip effect (see Lee et al., "Information Distortion in a Supply Chain: the Bullwhip effect", *Management Science*, Vol. 43, No. 4, 1997).

Control Policies

Proportional Control (P-Control): ($T_n=1$ implies Order Up To Base stock policy that is commonly used in inventory management literature).

$$u(t) = \frac{e(t)}{T_n}$$

Proportional Integral Control (PI-Control):

$$u(t) = \frac{1}{T_n}\left[e(t) + \frac{\sum_i e(t)}{T_i}\right]$$

Proportional Derivative Control (PD-Control):

$$u(t) = \frac{1}{T_n}[e(t) + T_d(e(t) - e(t-1))]$$

Proportional Integral Derivative Control (PID-Control):

$$u(t) = \frac{1}{T_n}\left[e(t) + \frac{\sum_i e(t)}{T_i} + T_d(e(t) - e(t-1))\right]$$

Now, we can define the governing equations for PID Control using z-transforms:

$$FD = \frac{zD}{z + T_a(-1 + z)}$$

$$NS = \frac{z}{-1+z}\left[\frac{O}{z^{T_p+1}} - D\right]$$

$$WIP = \left[\frac{O}{-1+z} - \frac{O}{z^{T_p}(-1+z)}\right]$$

$$O = [FD] + \left[\left(\frac{1}{T_n} + \frac{z}{T_nT_i(-1+z)} + \frac{T_d(-1+z)}{T_nz}\right)(ENS + EWIP)\right]$$

Given these above equations for PID control, the various other control policies can be obtained by setting the control policy parameters accordingly.

$T_n=1$, $T_i=\infty$, and $T_d=0$ implies Order-Up-To Policy
$T_i=\infty$ and $T_d=0$ implies P-Control
$T_d=0$ implies PI-Control
$T_i=\infty$ implies PD-Control
All non-zero and less than infinity implies PID-Control The transfer function for the orders as a function of the demand for PID-Control is given below.

$$\frac{O}{D} = \frac{z(Az^3 + Bz^2 + Cz + D)}{(X + Yz)(Pz^3 + Qz^2 + Rz + S)}$$

where:

$A=(1+T_i+T_dT_i)(T_p+T_a+1+\alpha)+T_nT_i$ $B=-[(T_i+2T_dT_i)(T_p+T_a+1+\alpha)+(1+T_i+T_dT_i)(T_p+T_a\alpha)+2T_nT_i]$ $C=T_dT_i(T_p+T_a+1+\alpha)+(T_i+2T_dT_i)(T_aT_p+\alpha)+T_nT_i$ $D=-T_dT_i(T_p+T_a+1)$ $X=-T_a$ $Y=1+T_a$ $P=T_nT_i$ $Q=1+T_i+T_iT_d-2T_nT_i$ $R=-[T_i+2T_iT_d-T_nT_i]$ $S=T_dT_i$ We know from control theory literature that the roots of the characteristic equation should lie within the unit circle in the complex plane for the control system to be stable. The denominator of the transfer function gives the roots for the characteristic equation for the control system. It is important to note that such stability from a control theoretic perspective is a minimum requirement. However, it does not tell us anything about the volatility arising from Bullwhip effect, which is captured by the objective function defined earlier. We will now discuss the control theoretic stability properties of the various control policies.

For P-Control, we find that the roots of the equation are $(T_d/(T_a+1))$ and $(-\frac{1}{2})$. Both these roots lie within the unit circle and hence the system is stable from a control theory perspective. We can see that this results in the OUT policy also being stable from a control theory perspective (as OUT policy can be obtained by setting $T_n=1$). But we know that OUT policy results in bullwhip. So, we are interested in both the system being stable from a control theory perspective and also one that has the least bullwhip.

For PD-Control, we find that the roots of the equation are $(T_d/(T_a+1))$ and $$\left(\frac{1}{2} - \frac{1+T_d}{2T_n}\right) \pm \left(\frac{1}{2}\sqrt{\left(1 - \frac{1+T_d}{T_n}\right)^2 + 4\frac{T_d}{T_n}}\right)$$

By setting $T_n=3$, $T_d=0.2$, we get the roots to be $(T_d/(T_a+1))$, 0.728 and −0.228, which means that the system is stable for such a parameter choice.

For PI-Control, we find that the roots of the equation are $(T_d/(T_a+1))$ and $$\left(1 - \frac{1+T_i}{2T_iT_n}\right) \pm \left(\frac{1}{2}\sqrt{\left(2 - \frac{1+T_i}{T_iT_n}\right)^2 - 4\left(1 - \frac{1}{T_n}\right)}\right)$$

By setting $T_n=3$, $T_i=10$, we get the roots to be $(T_d/(T_a+1))$, 0.833 and 0.8, which means that the system is stable for such a parameter choice.

Figure 9:
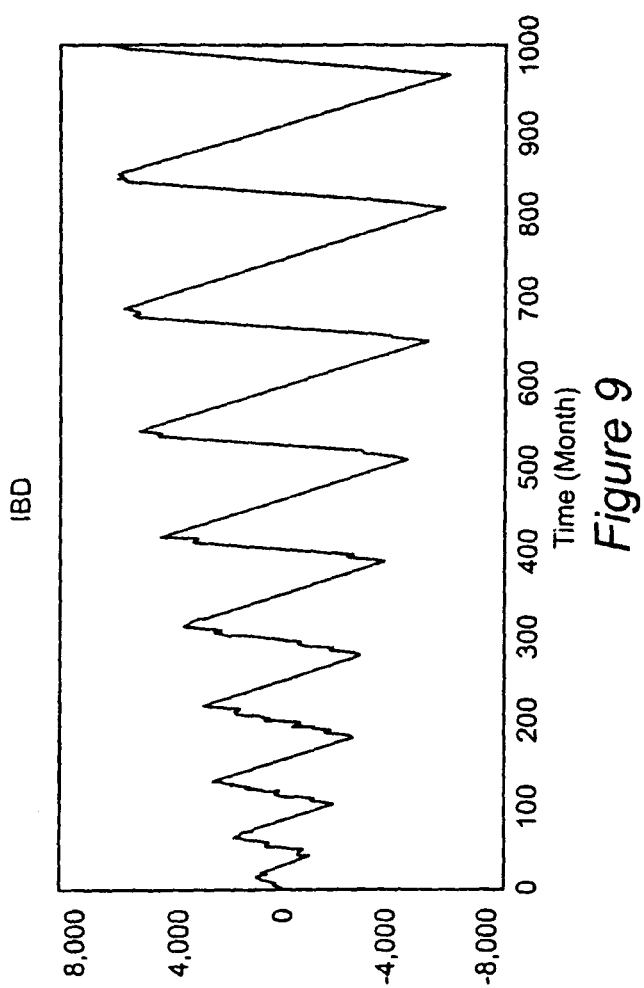
FIG. 9 is a graph showing inventory-backlog difference profile for a bad choice of the Control parameter for the Supply Chain Monitoring & Management scenario.
Figure 10:
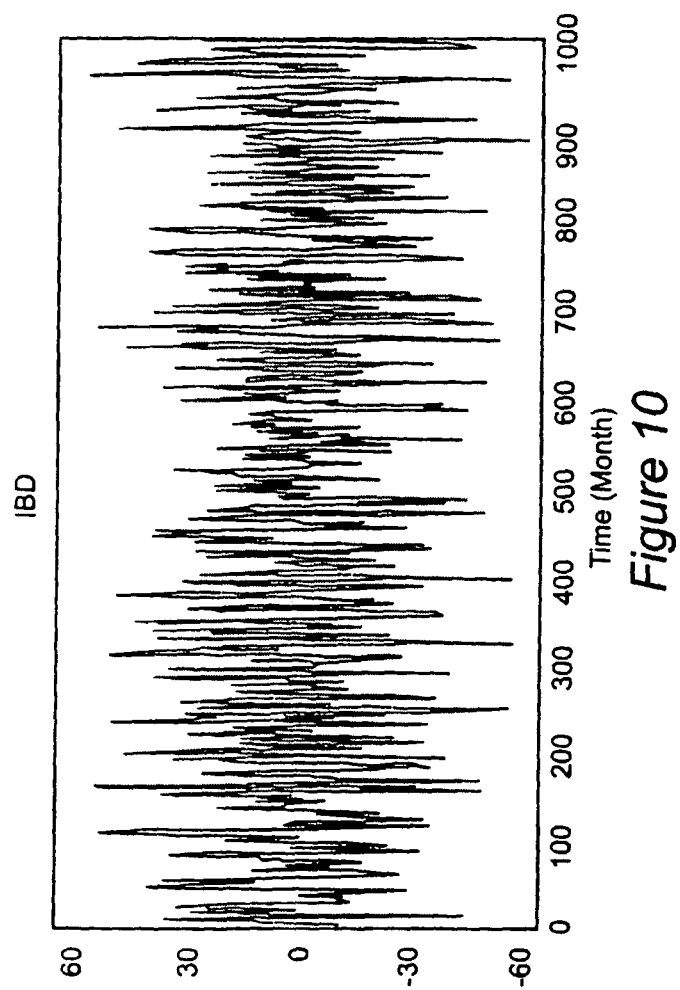
FIG. 10 is a graph showing inventory-backlog difference profile for a good choice of the Control parameter for the Supply Chain Monitoring & Management scenario.

Thus, we can attain stability from a control theory perspective by carefully setting the control policy parameters. As an example, FIG. 9 illustrates instability with a PI controller when the integral control parameter is chosen wrongly. We can see from FIG. 9 that the system inventory oscillates and diverges leading to instability. FIG. 10 illustrates how the control parameter can be tuned to produce stable behavior. It can be noted from FIG. 10 that the inventory is always within desirable limits. (Note that the scale for FIG. 10 is much smaller than FIG. 9.) The above examples show that we can select the control policy parameters such that we can get demand smoothing and also have stability from a control system perspective. A similar result applies for PID-Control as well. We can use simulation to examine the cost implications and measure the trade-off between responsiveness to demand and system volatility. The overall objective is to select the optimal control policy.

It was found that Proportional Control smoothens the ordering process and the flow across the system. This type of control reaps benefit by reducing the bullwhip, but increases the inventory and backorder costs. We find that the volatility in such a system is lesser than that obtained by combining information sharing with traditional Order Up To (OUT) policies but, the responsiveness (as determined by the inventory and backorder costs and hence the service levels) is worse. We need to choose the P-Control parameter, $T_n$, to find the appropriate trade-off between responsiveness and volatility. The usefulness and parameter choice for P-Control depends on both the forecast error and bias. Our simulation results indicate that a high $T_n$ value results in better business performance for cases of high forecast errors. In the case of forecast bias, we need to choose low $T_n$ values, but still the performance is not good enough in the presence of bias.

Derivative control adds prediction by looking at the change in the error values. We get better response than using just P-Control as the derivative control predicts error changes earlier and better. However, the volatility in the system is increased since derivative control is highly sensitive when it comes to reaction to noise in the system. The usefulness and choice of the derivative control parameter, $T_d$, depends on the forecast error. From our simulation results, we find that when the forecast error is low/medium, derivative control gives a good result in terms of maximizing the gain from the trade-off between responsiveness and volatility.

Integral Control reacts more to demand trends than proportional control. The usefulness and parameter choice for integral control depends on the forecast bias. Integral control is highly effective when the bias is high and the demand trends are not captured. This is analogous to integral control being used to remove the steady state offset in traditional process control. Thus, integral control can be used to counter the effect of forecast bias on the system.

Figure 11:
FIG. 11 is a histogram illustrating potential improvements from adaptively choosing control policies for the Supply Chain scenario.

We observe that there is no single universal solution that will work well in all situations. An interesting implication of the proposed invention is that the control policy for Business Performance Management can be adaptively chosen based on the business environment. In particular, for the supply chain scenario considered in this embodiment, the control policy (such as P, PI and PID or other policies) can be selected based on observations of appropriate system metrics, such as forecast error. For example, let us assume that the forecast error is constant for a period, then increases for some period of time and then comes back to the original level. Let us also assume that we use only P-Control for this illustration. We can either use a high parameter value or a low parameter value or adaptively change between the high and low values depending on the forecast situation. To quantify the value of adaptive control, we use the objection function defined earlier based on desired business performance measures (a weighted combination is needed for multi-objectives). At each time period, the parameters are chosen by optimizing the objective. FIG. 11 illustrates potential performance improvements that can be obtained from adaptively selecting the control policy—in particular, it shows the percentage difference of the per-period average cost when using different parameters and when using the parameters adaptively, using the performance with $T_n=2$ as a basis for the comparison. As we can see from FIG. 11, adaptively changing the parameters helps us achieve a better total cost and thus realize optimal control of business process. The scope of this invention extends to combining all control algorithms with Business Performance Management and is not limited by the details of particular control algorithms discussed in this embodiment.

Figure 12:
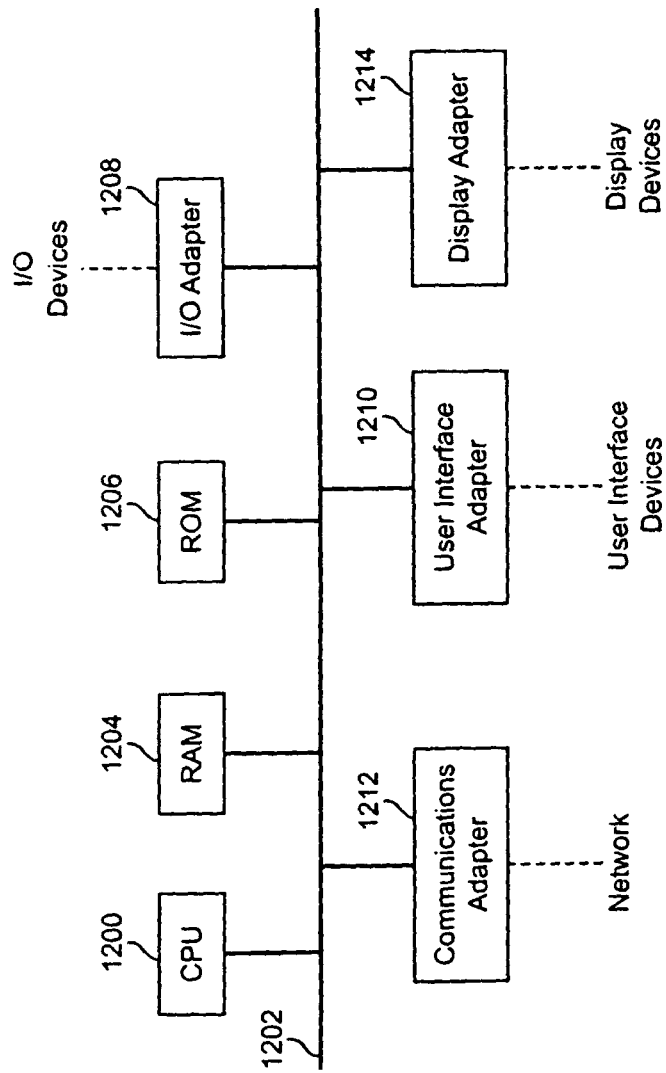
FIG. 12 is a block diagram of the environment and configuration of a computer system for implementing the present invention.

FIG. 12 shows a typical hardware configuration of a computer system in accordance with the invention that preferably has at least one Central Processing Unit (CPU) 1200. The CPUs are interconnected via a system bus 1202 to a random access memory (RAM) 1204, read-only memory (ROM) 1206, input/output adapter 1208 (for connecting peripheral devices such as disk units and tape drives to the bus), user interface adapter 1210 (for connecting user devices such as keyboard, mouse, etc. to the bus), communication adapter 1212 (for connecting the computer system to an information network such as Internet, Intranet, etc.) and a display adapter 1214 (for connecting the bus to a display device).

In addition to the environment in FIG. 12, a key aspect of this invention includes a computer-implemented method for combining control theory and Business Performance Management. As an example, this method may be implemented in the particular hardware environment discussed above. The method may be implemented, for example, by operating a computer, as embodied by a digital data processing apparatus to execute a sequence of machine-readable instructions. These instructions may reside in various types of signal-bearing media such as a CD, a diskette, etc.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method for analyzing data from Business Performance management systems and determining an action to manage Business Process Performance, the computer performing the steps of:
    developing, updating and calibrating a business performance model based on historical business performance metrics and control actions,
    defining business objectives based on desired business performance metrics,
    defining an objective function for capturing a trade-off between responsiveness and volatility of said business performance metrics,
    analyzing a plurality of control policies by using the business performance model to predict responsiveness and volatility of future business performance metrics for each of said plurality of control policies, each
    selecting control policy from said plurality that is an optimal trade-off between responsiveness and volatility of said business performance metrics based on the business objectives, and
    deploying control actions based on the optimal control policy.

2. A method according to claim 1, wherein the control policy is chosen adaptively based on a current business environment and the desired business performance metrics.

3. A method according to claim 1, wherein the optimal control policy is chosen based on tradeoff analysis done using business guidelines on different performance objectives.

4. A method according to claim 1, wherein data from Supply Chain Management systems are analyzed and an action to manage Supply Chain Performance is determined, the computer further performing the steps of:
    developing, updating and calibrating supply chain models based on supply chain data, and
    defining business objectives based on desired business performance measures.

5. A method according to claim 4, the computer further performing the steps of:
    analyzing control policies for placing replenishment orders by using the supply chain model to predict future supply chain performance for different control policies,
    selecting an optimal control policy, and
    placing supply chain orders based on the optimal control policy.

6. A computer implemented method for analyzing data from Business Performance Management systems and determining an action to manage Business Process Performance, the computer performing the steps of:
    developing, updating and calibrating a business performance model based on business process data,
    defining business objectives based on desired business performance metrics,
    defining an objective function for capturing a trade-off between responsiveness and volatility of said business performance metrics,
    analyzing a plurality of control policies by using the business performance model to predict responsiveness and volatility of future business process performance for each of said plurality of control policies,
    selecting a control policy from said plurality that is an optimal trade-off between responsiveness and volatility of said business performance metrics based on the business objectives, and
    deploying control actions based on the optimal control policy.

7. A method according to claim 6, wherein the steps are implemented in a controller as a component in a business performance management system.

8. A non-transitory signal-bearing medium tangibly embodying a program of machine readable instructions executable by a digital processing apparatus to perform a method for analyzing data from Business Performance Management systems and determining an action to manage Business Process Performance comprising the steps of:
    developing, updating and calibrating a business performance model based on historical business performance metrics and control actions,
    defining business objectives based on desired business performance metrics,
    defining an objective function for capturing a trade-off between responsiveness and volatility of said business performance metrics,
    analyzing control policies by using the business performance model to predict responsiveness and volatility of future business performance metrics for different control policies,
    selecting a control policy that is an optimal trade-off between responsiveness and volatility of said business performance metrics based on the business objectives, and
    deploying actions based on the optimal control policy.

9. A computer based system for analyzing data from Business Performance management systems and determining an action to manage Business Process Performance comprising:
    input means for receiving one or more set points for metrics and outputs generated by a Business Performance Management (BPM) system based on the events and metrics that are processed by the BPM system and producing a differential metric output;
    a controller receiving said differential metric output and a business objective based on desired business performance metrics and developing, updating and calibrating a business performance model based on historical business performance metrics and control actions, said controller defining an objective function for capturing a trade-off between responsiveness and volatility of said business performance metrics, analyzing a plurality of control policies by using the business performance model to predict responsiveness and volatility of future business performance metrics for each of said plurality of control policies and selecting a control policy from said plurality that is an optimal trade-off between responsiveness and volatility of said business performance metrics based on the business objective;
    a business process execution means deploying actions selected by said controller based on the optimal control policy; and
    means measuring events and metrics generated as a result of deploying actions by the business process execution means, which measured events and metrics are processed by the BPM system to generate feedback to the input means.

* * * * *